(12) United States Patent
Jourdan

(10) Patent No.: US 11,735,967 B2
(45) Date of Patent: Aug. 22, 2023

(54) ROTARY ELECTRIC MACHINE WITH ROTOR HAVING PERMANENT MAGNETS WITH CONCAVE FACES BETWEEN TWO FLAT PORTIONS

(71) Applicant: MOTEURS LEROY-SOMER, Angouleme (FR)

(72) Inventor: Dominique Jourdan, Saint Genis-Laval (FR)

(73) Assignee: MOTEURS LEROY-SOMER, Angouleme (FR)

( * ) Notice: Subject to any disclaimer, the term of this patent is extended or adjusted under 35 U.S.C. 154(b) by 256 days.

(21) Appl. No.: 16/622,975

(22) PCT Filed: Jun. 12, 2018

(86) PCT No.: PCT/EP2018/065533
§ 371 (c)(1),
(2) Date: Dec. 16, 2019

(87) PCT Pub. No.: WO2018/229065
PCT Pub. Date: Dec. 20, 2018

(65) Prior Publication Data
US 2020/0119604 A1    Apr. 16, 2020

(30) Foreign Application Priority Data
Jun. 15, 2017    (FR) ...................................... 17 55442

(51) Int. Cl.
*H02K 1/27* (2022.01)
*H02K 1/2781* (2022.01)
*H02K 1/14* (2006.01)

(52) U.S. Cl.
CPC ............ *H02K 1/2781* (2022.01); *H02K 1/146* (2013.01); *H02K 2201/03* (2013.01); *H02K 2213/03* (2013.01)

(58) Field of Classification Search
CPC ........ H02K 1/27; H02K 1/2766; H02K 1/276; H02K 1/146; H02K 2213/03; H02K 2201/03
(Continued)

(56) References Cited

U.S. PATENT DOCUMENTS 4,278,927 A * 7/1981 Grohe ..................... H02K 29/12
                                                        318/648
4,320,669 A * 3/1982 Grohe ..................... G01C 19/20
                                                        74/5.37
(Continued)

FOREIGN PATENT DOCUMENTS

CN    102355072 A    2/2012
DE    102009024014 A1    12/2010
(Continued)

OTHER PUBLICATIONS

Jul. 25, 2018 International Search Report issued in International Patent Application No. PCT/EP2018/065533.
(Continued)

*Primary Examiner* — Maged M Almawri
(74) *Attorney, Agent, or Firm* — Oliff PLC

(57) ABSTRACT

A rotary electric machine having a stator, and a rotor having a shaft and permanent magnets on the surface of the shaft, the permanent magnets having a face of concave overall shape directed toward the stator.

16 Claims, 2 Drawing Sheets

Figure 1:
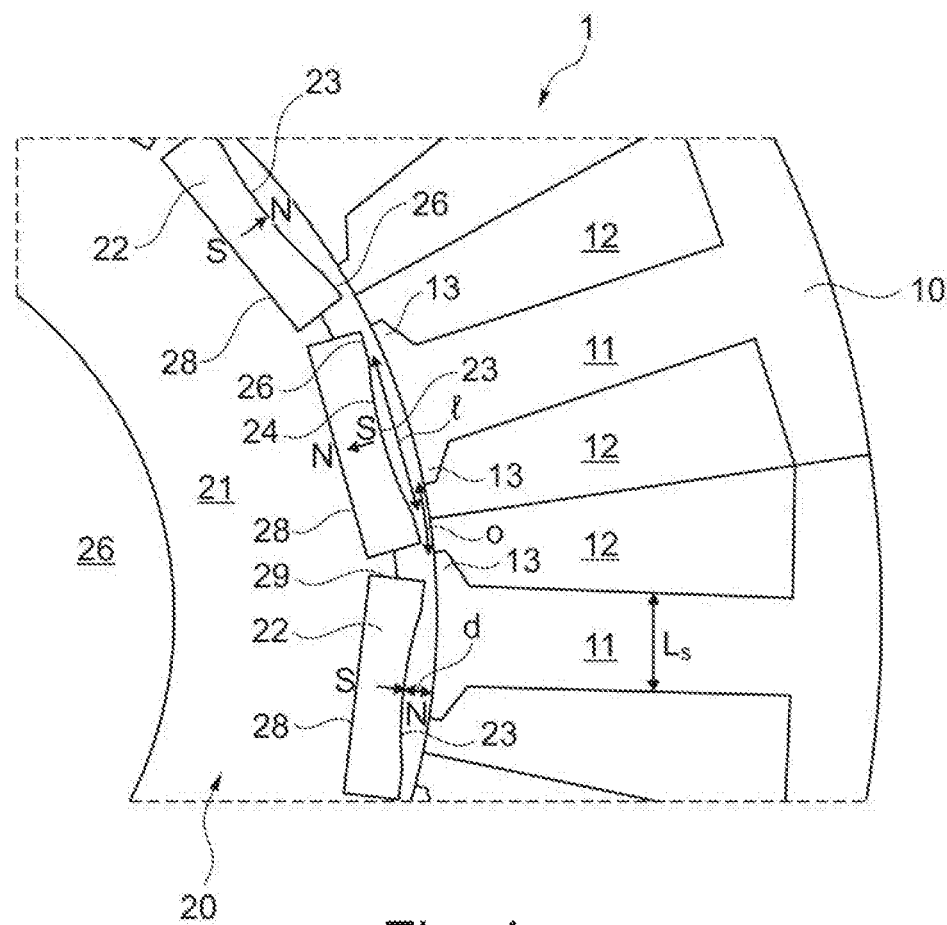

(58) Field of Classification Search
USPC ............ 310/156.38, 156.01, 156.53, 156.56, 310/156.83, 156.43
See application file for complete search history.

(56) References Cited

U.S. PATENT DOCUMENTS

| | | | | |
|---|---|---|---|---|
| 4,361,776 A * | 11/1982 | Hayashi | ................... | H02K 3/47 310/68 R |
| 4,570,507 A * | 2/1986 | Hunter | ................... | G01C 19/20 74/5.1 |
| 4,795,936 A * | 1/1989 | Crosetto | ................ | H02K 1/278 310/156.31 |
| 5,178,528 A * | 1/1993 | Malfit | ..................... | F04C 2/086 418/152 |
| 5,198,763 A * | 3/1993 | Konishi | ................... | G01B 7/02 324/207.25 |
| 5,473,210 A * | 12/1995 | Someya | ................ | H02K 15/03 310/154.19 |
| 5,510,662 A * | 4/1996 | Tanimoto | ............. | H02K 1/2766 310/156.53 |
| 5,519,274 A * | 5/1996 | Scharrer | ............... | F16C 32/044 384/103 |
| 5,532,531 A * | 7/1996 | Sakamoto | ............. | H02K 37/12 310/49.53 |
| 5,581,140 A * | 12/1996 | Futami | .................. | H02K 15/03 310/156.53 |
| 5,604,621 A * | 2/1997 | Fujikane | ............. | G02B 26/121 384/372 |
| 5,723,929 A * | 3/1998 | Niimi | ...................... | H02K 1/17 310/152 |
| 5,731,648 A * | 3/1998 | Gaughan | ............. | H02K 1/2733 310/264 |
| 5,798,590 A * | 8/1998 | Sakakibara | .......... | H02K 41/031 310/156.19 |
| 5,811,904 A * | 9/1998 | Tajima | .................. | H02K 1/276 310/214 |
| 5,821,661 A * | 10/1998 | Wissmach | ............. | H02K 3/522 310/194 |
| 5,874,798 A * | 2/1999 | Wiegele | .................. | F01D 1/026 310/40 MM |
| 5,929,551 A * | 7/1999 | El-Antably | .............. | H02K 1/30 310/91 |
| 5,945,760 A * | 8/1999 | Honda | ................... | H02K 21/14 310/156.53 |
| 5,986,379 A * | 11/1999 | Hollenbeck | ............ | H02K 29/08 310/68 B |
| 6,008,562 A * | 12/1999 | El-Antably | ............ | H02K 1/246 29/598 |
| 6,064,134 A * | 5/2000 | El-Antably | .............. | H02K 1/30 310/216.107 |
| 6,116,537 A * | 9/2000 | Kempas | ................ | F41G 7/2213 244/3.1 |
| 6,181,035 B1 * | 1/2001 | Acquaviva | ............. | H02K 29/03 310/156.16 |
| 6,239,532 B1 * | 5/2001 | Hollenbeck | ............ | H02K 29/08 310/68 B |
| 6,617,732 B1 * | 9/2003 | Lin | ...................... | F16C 32/0429 310/90.5 |
| 6,657,350 B2 * | 12/2003 | Kimura | .................. | H02K 1/276 310/156.53 |
| 6,713,923 B2 * | 3/2004 | Hino | ...................... | H02K 15/03 310/156.55 |
| 6,727,630 B1 * | 4/2004 | Maslov | .................. | H02K 29/03 310/156.01 |
| 6,744,164 B2 * | 6/2004 | Kadoya | ................... | B60L 7/06 310/156.01 |
| 6,784,582 B1 * | 8/2004 | Kolomeitsev | ........ | H02K 1/2733 310/156.01 |
| 6,812,614 B2 * | 11/2004 | Yamamoto | ............. | H02K 1/278 310/156.01 |
| 6,826,824 B2 * | 12/2004 | Hiroyuki | ................ | H02K 15/03 29/598 |
| 6,836,045 B2 * | 12/2004 | Murakami | ............. | H02K 1/246 310/216.106 |
| 6,853,106 B2 * | 2/2005 | Fujiwara | ................ | H02K 21/16 310/179 |
| 6,909,216 B2 * | 6/2005 | Kadoya | .................. | H02K 21/16 310/198 |
| 6,940,199 B2 * | 9/2005 | Imamura | ................ | H02K 1/278 310/156.01 |
| 7,057,322 B2 * | 6/2006 | Araki | .................... | H02K 1/2766 310/156.53 |
| 7,095,148 B2 * | 8/2006 | Mayumi | ................. | H02K 37/14 310/90 |
| 7,164,216 B2 * | 1/2007 | Shimoyama | ........... | H02K 37/14 310/156.08 |
| 7,170,209 B2 * | 1/2007 | Araki | ................... | H02K 1/2766 29/598 |
| 7,459,813 B2 * | 12/2008 | Naganuma | ........... | H02K 1/2795 310/75 B |
| 7,462,969 B2 * | 12/2008 | Kawamoto | ............. | H02K 5/08 310/400 |
| 7,564,157 B2 * | 7/2009 | Groening | ............. | H02K 41/031 310/156.44 |
| 7,595,578 B2 * | 9/2009 | Aramaki | ............... | H02K 15/022 29/603.01 |
| 7,598,645 B2 * | 10/2009 | Ley | ...................... | H02K 1/2766 310/156.56 |
| 7,768,172 B2 * | 8/2010 | Takahata | ................ | H02K 1/276 310/156.56 |
| 7,795,772 B2 * | 9/2010 | Arimitsu | ................ | H02K 1/276 310/156.56 |
| 7,821,169 B2 * | 10/2010 | Okazaki | ................ | H02K 21/24 310/156.36 |
| 7,839,045 B2 * | 11/2010 | Wu | ...................... | H02K 1/2791 310/156.48 |
| 7,915,776 B2 * | 3/2011 | Takahata | ................ | H02K 1/276 310/156.56 |
| 7,939,982 B2 * | 5/2011 | Horst | ..................... | H02K 1/276 310/156.47 |
| 7,952,249 B2 * | 5/2011 | Kori | ...................... | B60L 3/0061 310/156.53 |
| 7,960,884 B2 * | 6/2011 | Miyata | ................... | H02K 21/24 310/91 |
| 7,994,674 B2 * | 8/2011 | McClellan | ............. | H02K 53/00 310/154.25 |
| 8,004,138 B2 * | 8/2011 | Iwata | .................... | H02K 1/276 310/52 |
| 8,030,817 B2 * | 10/2011 | Sakai | ................... | H02K 1/2766 310/156.43 |
| 8,040,009 B2 * | 10/2011 | Aota | ...................... | H02K 1/276 310/156.38 |
| 8,049,347 B2 * | 11/2011 | Nishida | ................ | H02K 21/222 290/1 A |
| 8,067,873 B2 * | 11/2011 | Nam | ...................... | H02K 1/276 310/156.83 |
| 8,299,672 B2 * | 10/2012 | McClellan | ............. | H02K 53/00 310/154.22 |
| 8,421,293 B2 * | 4/2013 | Yamashita | ............. | H01F 41/028 310/156.43 |
| 8,629,590 B2 * | 1/2014 | Marchitto | ................ | H02K 9/02 310/67 R |
| 8,659,200 B2 * | 2/2014 | Adaniya | ................ | H02K 21/16 310/156.57 |
| 8,664,822 B2 * | 3/2014 | Vyas | ..................... | H02K 1/2766 310/156.43 |
| 8,664,826 B2 * | 3/2014 | Krotsch | ................ | H02K 29/03 310/156.46 |
| 8,928,197 B2 * | 1/2015 | Jurkovic | ............... | H02K 1/2766 310/156.53 |
| 9,130,422 B2 * | 9/2015 | Rahman | ................ | H02K 21/14 |
| 9,130,441 B2 * | 9/2015 | Okada | ................... | H02K 29/08 |
| 9,762,109 B2 * | 9/2017 | Yang | .................... | H02K 1/278 |
| 10,530,208 B2 * | 1/2020 | Buehler | ................ | H02K 29/03 |
| 10,784,733 B2 * | 9/2020 | Shimokawa | ............ | H02K 1/146 |
| 2003/0025415 A1 * | 2/2003 | Hino | ...................... | H02K 15/03 310/156.56 |

(56) References Cited

U.S. PATENT DOCUMENTS

| | | | | |
|---|---|---|---|---|
| 2003/0094875 A1* | 5/2003 | Sakuma | H02K 21/14 | 310/156.56 |
| 2004/0150282 A1* | 8/2004 | Murakami | H02K 1/246 | 310/156.53 |
| 2006/0055266 A1* | 3/2006 | Iwami | H02K 1/2733 | 310/43 |
| 2007/0126304 A1* | 6/2007 | Ito | H02K 1/28 | 310/156.53 |
| 2008/0157619 A1* | 7/2008 | Wu | H02K 1/2791 | 310/156.48 |
| 2008/0224558 A1* | 9/2008 | Ionel | H02K 1/2766 | 310/156.57 |
| 2010/0109467 A1* | 5/2010 | Aota | H02K 1/276 | 310/156.53 |
| 2011/0030419 A1* | 2/2011 | Kikuchi | H02K 21/46 | 62/498 |
| 2012/0025655 A1* | 2/2012 | Yang | H02K 29/03 | 310/156.38 |
| 2012/0091845 A1* | 4/2012 | Takemoto | H02K 1/276 | 310/156.01 |
| 2012/0126654 A1* | 5/2012 | Islam | H02K 1/278 | 310/156.38 |
| 2012/0194024 A1* | 8/2012 | Okada | H02K 1/28 | 310/156.01 |
| 2012/0267975 A1* | 10/2012 | Nishimura | H02K 1/148 | 310/156.01 |
| 2013/0113328 A1* | 5/2013 | Kogure | H02K 1/2766 | 310/156.53 |
| 2013/0207498 A1* | 8/2013 | Kusase | H02K 1/16 | 310/156.01 |
| 2013/0320797 A1* | 12/2013 | Vyas | H02K 1/2766 | 310/156.43 |
| 2014/0265705 A1* | 9/2014 | Tsuchida | H02K 1/276 | 310/156.38 |

FOREIGN PATENT DOCUMENTS

| | | |
|---|---|---|
| DE | 102014222064 A1 | 5/2016 |
| EP | 1793482 A1 | 6/2007 |
| WO | 2015/068749 A1 | 5/2015 |

OTHER PUBLICATIONS

Dec. 17, 2019 International Preliminary Report on Patentability issued in International Patent Application No. PCT/EP2018/065533.

Jun. 8, 2021 Office Action issued in European Patent Application No. 18729167.9.

\* cited by examiner

ROTARY ELECTRIC MACHINE WITH ROTOR HAVING PERMANENT MAGNETS WITH CONCAVE FACES BETWEEN TWO FLAT PORTIONS

The present invention lies in the field of rotary electric machines, and more particularly, but not exclusively, those used for motorizing robots.

The application EP 1 793 482 relates to a rotary electric machine with reduced torque ripple under load, which is intended to drive elevator cabs, and has an external rotor having substantially flat faces directed toward the stator.

Also known are rotary electric machines having an external rotor, in which the permanent magnets of the external rotor have a main face directed toward the stator, which is in the form of a cylinder of revolution.

In the case of an internal rotor, the main face of a magnet directed toward the stator has a convex overall shape.

However, in particular in the field of the motorization of robots, it may be necessary to reduce the magnetic notching of a rotary electric machine, in particular for example for a permanent-magnet motor controlled by a variable frequency drive. Magnetic notching is also referred to as "cogging" and corresponds to a torque ripple under no load or under a very low load.

Therefore, there is a need, in particular in the field of the motorization of robots, to have rotary electric machines with low torque ripple under no load or under a very low load.

The invention aims to meet all or some of this need and relates, according to one of its aspects, to a rotary electric machine having:
  a stator, and
  a rotor having a shaft and permanent magnets disposed on the surface of the shaft, the permanent magnets having a face of concave overall shape directed toward the stator.

The presence of a face of concave overall shape directed toward the stator for the permanent magnets of the rotor makes it possible to optimize the torque ripple under no load or under a very low load.

It is thus possible to seek to minimize the torque ripple while obtaining a minimum peak torque to be achieved, for a preset mechanical air gap.

Moreover, the rotor has a greater capacity to resist demagnetization.

Rotor

The expression "face of concave overall shape" is understood as meaning that the face, directed toward the stator, of the permanent magnets of the rotor has a curvature that gives it a recessed surface. The face may be entirely concave or have one or more concave portions and one or more flat portions.

The presence of the flat portions may make it possible to better avoid interference between the rotor and the stator.

In one embodiment, the rotor may be internal. In this case, the face of the magnets that is directed toward the stator corresponds to the opposite face of the magnets from an axis of rotation X of the machine.

In a variant, the rotor may be external, and this can make it possible in particular for it to turn at a relatively high speed, limiting the risk of detachment of the magnets. In this case, the face of the magnets that is directed toward the stator corresponds to the face of the magnets that is directed toward the axis of rotation X of the machine.

In the case of an external rotor, the concavity of the face directed toward the stator of the permanent magnets of the rotor is greater than a concavity that is brought about just by a cylindrical shape of the face, which would be on account of the external disposition of the rotor in order to make it possible to position the stator inside the latter and to form a sufficient air gap between the rotor and the stator. In other words, the concavity of the faces directed toward the stator of the permanent magnets of the rotor is greater than a surface in the form of a cylinder of revolution.

The shaft of the rotor may be integral, being for example hollow or solid.

In a variant, it could not be integral, comprising for example a stack of laminations. The laminations can each be covered with an insulating varnish in order to limit the losses through induced current.

A concave face of a permanent magnet of the rotor may have a concave portion. The width l of the concave portion, measured perpendicularly to a radius of the rotor, may be between $0.1\pi(D_S-2d)/P$ and $2\pi(D_S-2d)/P$ mm (millimeters),
  where $D_S$ is the diameter of the stator bore,
  P is the number of poles of the rotor, and
  d is the simple air gap, that is to say the smallest width of the air gap.

The width l of the concave portion, measured perpendicularly to a radius of the rotor, may be between 2 and 56 mm, better still between 4 and 40 mm, or even between 8 and 20 mm, even better still between 8 and 12 mm.

A width of a permanent magnet of the rotor measured perpendicularly to the axis of rotation is for example between $0.1\pi(D_S-2d)/P$ and $2\pi(D_S-2d)/P$ mm (millimeters).

The width of a permanent magnet of the rotor measured perpendicularly to the axis of rotation is for example between 4 and 56 mm, better still between 6 and 50 mm, or even between 8 and 40 mm, even better still between 10 and 20 mm, being for example around 13 mm.

The greatest depth p of the concavity of the concave portion, measured along a radius of the rotor, may be between 0.01 mm and the thickness h of the corresponding magnet, in particular between 0.05 and 3 mm, or even between 0.1 and 1.5 mm.

The greatest depth of the concavity of the concave portion, measured along a radius of the rotor, may be situated at the middle of the concave face of the corresponding permanent magnet. A permanent magnet is preferably symmetric with respect to a plane that intersects it in its middle, this plane passing through the axis of rotation of the machine and a radius of the rotor. In a variant, the greatest depth of the concavity of the concave portion, measured along a radius of the rotor, is situated away from the middle of the concave face of the corresponding permanent magnet. A permanent magnet may not be symmetric with respect to a plane that intersects it in its middle.

The concave portion may be a portion of a circle or ellipse in section. The radius of the circle or the major axis of the ellipse may be for example between 0.1 h*, where h is the thickness of the magnet, and 100 h mm, in particular between 4 and 56 mm, better still between 6 and 40 mm, being for example around 13 mm.

The concave portion of a concave face may be disposed between two flat lateral portions. The presence of flat lateral portions on the face of concave overall shape makes it possible to take advantage of the concavity for the face of the magnets that is oriented toward the stator, while having a sufficient air gap between the rotor and the stator.

The width of a flat lateral portion measured perpendicularly to a radius of the rotor is for example between 0 and the width L of the magnet, better still between 0.75 and 7 mm, being for example around 2 mm.

The concave portion may make up 20 to 100% of the total width of the corresponding magnet, better still between 25 and 90%, or even between 40 and 80%. In one embodiment, the concave portion makes up 75% of the total width of the corresponding magnet. In another embodiment, in the absence of a flat lateral portion, the concave portion makes up 100% of the total width of the corresponding magnet.

The permanent magnets of the rotor may have, when the machine is viewed along the axis of rotation, a cross section of elongate shape. In particular, the permanent magnets of the rotor may have, when the machine is viewed along the axis of rotation of the rotor, a cross section of rectangular overall shape with the long side oriented perpendicularly to a radius of the machine.

The permanent magnets of the rotor may have a thickness h, measured along a radius of the rotor, of between 0.5 and 32 d, where d is the smallest width of the air gap, in particular between 1 and 20 mm, better still between 2 and 10 mm, or even between 3 and 5 mm.

A ratio p/h between the greatest depth of the concavity of the concave portion, measured along a radius of the rotor, and the thickness of a permanent magnet is for example between 0.01 and 0.9, better still between 0.1 and 0.4.

The rotor and the stator form an air gap between one another. The air gap may have a width, measured along a radius of the machine, of between 0.5 and 3 mm, better still between 0.6 and 1.4 mm, being for example around 0.9 mm. The air gap is preferably greater than 5/10 mm, better still greater than 7/10 mm, in order to allow the rotation of the rotor in or around the stator.

The width $d_0$ of the air gap, measured along a radius passing through the middle of a magnet, may be between 0.5 and 5 mm, better still between 0.75 and 3 mm, being for example around 1.6 mm. The air gap may be widest at the middle of a magnet, for the machine according to the invention, inasmuch as the concavity of the concave face of the magnet is deepest there.

The bore $D_R$ of the rotor, which corresponds to the outside diameter of the rotor in the case of an internal rotor, is for example between 15 and 100 mm, better still between 20 and 70 mm, being for example around 65 mm.

The magnets may or may not be monolithic. In one embodiment, a pole of the rotor is formed by a one-piece permanent magnet. In a variant, a pole of the rotor is formed of several magnets that can be disposed successively along the axis of rotation of the rotor.

The permanent magnets may be made of ferrites, plasto-ferrites, rare earths or plasto-rare earths, or AlNiCo.

The permanent magnets may be formed from a powder and then machined.

The remanent flux density in the permanent magnets of a pole of the rotor may be between 0.2 Tesla and 1.5 Tesla, better still between 0.3 Tesla and 1.3 Tesla, being for example around 1.2 Tesla.

The permanent magnets of the rotor have a fastening face on the opposite side from the concave face directed toward the stator. The fastening face may be flat. A flat face may make it easier to install the magnets on the shaft. In a variant, the fastening face could be convex, and this may make it possible to improve the electromagnetic performance of the machine. The convexity of the fastening face may be directed toward the axis of rotation in the case of an internal rotor, or toward the outside in the case of an external rotor, and this may make it possible to improve the electromagnetic performance of the machine.

In the case of a flat face, the flat face is oriented perpendicularly to the radius passing through the axis of rotation and intersecting the corresponding magnet halfway along the latter.

The permanent magnets may be fastened to the shaft of the rotor by adhesive bonding, for example on a cylindrical surface of the shaft or in a housing provided for this purpose at the surface of the shaft. In a variant, they may be crimped in a corresponding housing of the shaft. The housing may have a flat or concave surface, depending on the shape of the fastening face of the magnets.

The shaft of the rotor may be made of a stack of laminations.

Stator

The stator may have concentrated winding. The stator may have teeth and coils disposed on the teeth. The stator may thus be wound on teeth, in other words have non-distributed winding. In a variant, the stator could have distributed winding.

The teeth of the stator may have pole shoes. In a variant, the teeth of the stator could not have pole shoes.

The opening of the slots in the stator, measured circumferentially, between the pole shoes if appropriate, is for example between 0.175 mm and $\pi*D_S-N*L_S$ mm (millimeters), where $D_S$ is the diameter of the bore of the stator, N is the number of teeth of the stator, and $L_S$ is the width of the teeth of the stator, for example less than 8 mm, in particular between 0.5 and 3 mm, being for example around 1.5 mm.

The teeth of the stator may have end faces of concave shape directed toward the rotor, in particular in the case of an internal rotor. In a variant, in the case of an external rotor, the teeth of the stator may have end faces of convex shape directed toward the rotor.

The end faces of the teeth of the stator may be for example cylinder portions, which may have a radius of curvature corresponding to the distance between the crown of the teeth and the axis of rotation X of the machine.

The bore $D_S$ of the stator, which corresponds to the inside diameter of the stator in the case of an external stator, is for example between 20 and 220 mm, better still between 25 and 110 mm, being for example around 70 mm.

The teeth of the stator form a yoke of the stator that may be in one piece, or in a variant may be formed of a string of teeth connected together by material bridges, or of a plurality of separate teeth. In all cases, the stator may have an external field frame surrounding the yoke.

The teeth of the stator may be made with a stack of laminations, each covered with an insulating varnish, in order to limit losses through induced current.

Machine

The machine may form a generator or a motor.

The rotary electric machine according to the invention may have an outside diameter of for example between 40 and 280 mm, better still between 50 and 220 mm, being for example around 135 mm. The diameter may for example be less than or equal to 240 mm, being in particular between 40 mm and 190 mm.

The power of the machine may be between 0.1 and 15 kW, being for example around 0.75 kW, this value being in no way limiting.

The machine may have a single internal rotor or, in a variant, a single external rotor, or in another variant, an internal rotor and an external rotor that are disposed radially on either side of the stator and rotationally coupled.

The number of slots per pole and per phase may be an integer or a fraction.

The number of poles P of the rotor is for example between 4 and 40 and the number of teeth S of the stator is for example between 6 and 48.

The invention also relates to a robot having a rotary electric machine as described above for the motorization thereof.

DETAILED DESCRIPTION

Figures 2A, 2B:
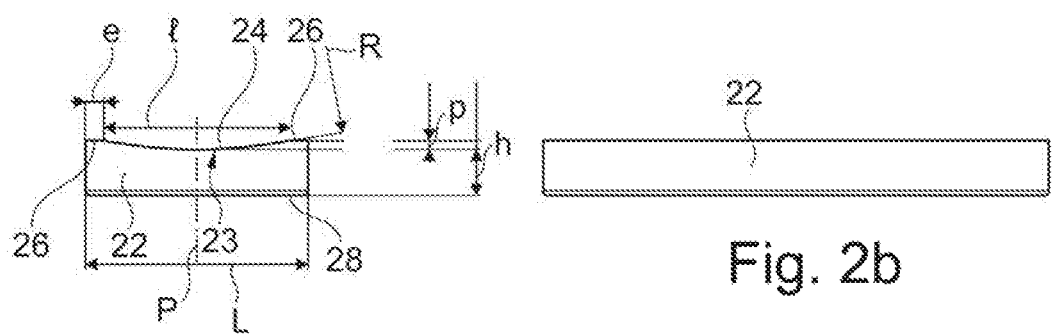
Figure 3:
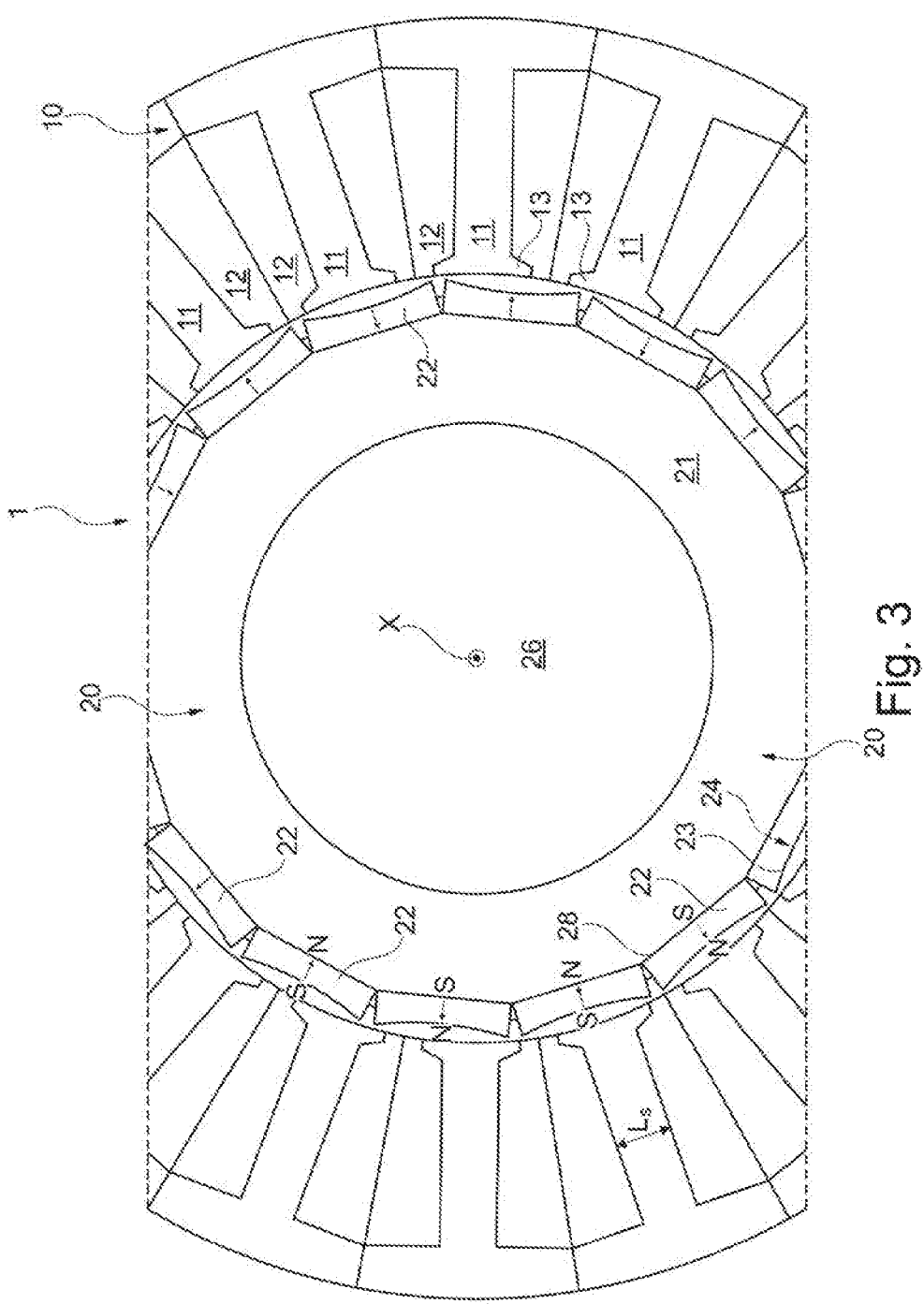

The invention may be understood better from reading the following detailed description of nonlimiting implementation examples thereof and from examining the appended drawing, in which:

FIG. 1 is a partial schematic view of a rotary electric machine according to the invention, FIGS. 2a and 2b are views in cross section and longitudinal section, respectively, of a permanent magnet of the machine in FIG. 1, and FIG. 3 is a view similar to FIG. 1 of an embodiment variant.

FIG. 1 shows a rotary electric machine 1 according to the invention, having an external stator 10 and an internal rotor 20 having a shaft 21 and permanent magnets 22 disposed on the surface of the shaft 21.

The stator 10 has concentrated winding in the example described. The stator 10 has teeth 11 that each bear an individual coil 12 disposed on the corresponding tooth. The coils 12 are connected electrically together so as to be supplied with a three-phase current.

The teeth of the stator have pole shoes 13. The opening o of the slots in the stator, measured circumferentially, between the pole shoes 13, is for example around 1.5 mm.

The bore of the stator, which corresponds to the inside diameter of the stator, is around 90 mm.

The stator also has an external field frame surrounding the yoke (not shown).

On the rotor, the shaft 21 is integral, being hollow in the middle, forming a space 26.

According to the invention, the permanent magnets 22 of the rotor have a face 23 that is directed toward the stator and has a concave overall shape. The face 23 of the magnets that is directed toward the stator corresponds to the opposite face of the magnets from the axis of rotation X of the machine.

The concave face 23 of a permanent magnet 22 of the rotor has a concave portion 24.

The width l of the concave portion 24, measured perpendicularly to a radius of the rotor, in section, is around 9 mm in the example described.

The width L of a permanent magnet 22 of the rotor, measured perpendicularly to the axis of rotation, in section, is around 13 mm.

The greatest depth p of the concavity of the concave portion, measured along a radius of the rotor, in section, is around 0.5 mm.

The greatest depth of the concavity of the concave portion, measured along a radius of the rotor, is situated at the middle of the concave face of the corresponding permanent magnet in the example described. The permanent magnet is symmetric with respect to a plane P that intersects it in its middle, this plane passing through the axis of rotation of the machine and a radius of the rotor.

The concave portion 24 is a portion of a circle, with a radius R of around 20 mm, in section in the example described.

The concave portion 24 of the concave face 23 is disposed between two flat lateral portions 26.

The width e of a flat lateral portion measured perpendicularly to a radius of the rotor, in section, is around 2 mm.

The concave portion forms around 75% of the total width of the corresponding magnet in the example described.

The permanent magnets of the rotor have, when the machine is viewed along the axis of rotation, a cross section of rectangular overall shape, with the long side oriented perpendicularly to a radius of the machine.

The permanent magnets 22 of the rotor have a thickness h, measured along a radius of the rotor, in section, of around 3 mm.

A ratio p/h between the greatest depth p of the concavity of the concave portion, measured along a radius of the rotor, and the thickness h of the permanent magnet 22 is around 0.2.

The rotor and the stator form an air gap 30 between one another. The air gap has a width, measured along a radius of the machine, in section, of around 0.9 mm. The width $d_0$ of the air gap, measured along a radius passing through the middle of a magnet 22, in section, is around 1.5 mm.

The bore of the rotor, which corresponds to the outside diameter of the rotor, is around 50 mm.

The permanent magnets 22 of the rotor have a fastening face 28 on the opposite side from the concave face 23 directed toward the stator, said fastening face 28 having a flat shape in the example described. The flat face is oriented perpendicularly to the radius passing through the axis of rotation and intersecting the corresponding magnet 22 halfway along the latter.

The permanent magnets 22 are fastened to the shaft of the rotor by adhesive bonding in a housing 29 provided for this purpose at the surface of the shaft 21. The housing 29 has a flat surface corresponding to the shape of the fastening face of the magnets.

The concave face 23 may have one or more concave portions 24 and one or more flat portions 26, as illustrated above, or be entirely concave, as has been illustrated by way of example in FIG. 3.

In this example, in the absence of a flat lateral portion, the concave portion 24 makes up 100% of the total width of the corresponding magnet.

In the examples in question, the rotor has 16 poles and the stator has 18 teeth. If the number thereof is different, this does not constitute a departure from the scope of the present invention.

The invention is not limited to the exemplary embodiments that have just been described, and the rotor may for example have a different number of poles, this also being the case for the teeth of the stator.

Moreover, in the example described, the rotor is internal, but if the rotor is external, or if the machine has both an internal rotor and an external rotor that are each disposed radially on either side of the stator and are rotationally coupled, this does not constitute a departure from the scope of the present invention.

The machine may be used not only as a motor but also as a generator in order to recover energy, for example.

The machine according to the invention may find applications other than the motorization of robots.

The invention claimed is:

1. A rotary electric machine having:
   a stator having teeth, and
   an internal rotor having a shaft and permanent magnets disposed on the surface of the shaft, the permanent magnets having a face of concave overall shape directed toward the stator, a concave face of the permanent magnet of the rotor having a concave portion, the concave portion of the concave face being disposed between two flat lateral portions, the teeth of the stator having end faces of concave shape directed toward the rotor, wherein the faces of concave overall shape of the permanent magnets are directed toward the stator in a radial direction outward from an axis of rotation of the rotary electric machine, wherein a width of a permanent magnet of the rotor measured perpendicularly to the axis of rotation is between $0.1\pi(D_S-2d)/P$ and $2\pi(D_S-2d)/P$ mm (millimeters), where $D_S$ is the diameter of a stator bore, P is the number of poles of the rotor, and d is a simple air gap, that is to say the smallest width of the air gap.

2. The machine as claimed in claim 1, wherein the permanent magnets of the rotor have a thickness, measured along a radius of the rotor, of between 2 and 10 mm.

3. The machine as claimed in claim 1, wherein a ratio between the greatest depth of the concavity of the concave portion, measured along a radius of the rotor, and the thickness of the permanent magnet is between 0 and 0.9.

4. The machine as claimed in claim 1, wherein the permanent magnets are fastened to the shaft of the rotor by adhesive bonding.

5. The machine as claimed in claim 1, wherein the permanent magnets have a flat fastening face on the opposite side from the concave face directed towards the stator.

6. The machine according to claim 1, wherein a width of a flat lateral portion measured perpendicularly to a radius of the rotor is between 0.75 and 7 mm.

7. The machine as claimed in claim 1, wherein the rotor and stator form an air gap between one another, the air gap having a width, measured along a radius of the machine, of between 0.5 and 3 mm.

8. The machine as claimed in claim 7, wherein the width of the air gap, measured along a radius passing through the middle of one of the permanent magnets, is between 0.5 and 5 mm.

9. The machine as claimed in claim 1, wherein the concave portion has a width measured perpendicularly to a radius of the rotor of between 2 and 56 mm.

10. The machine as claimed in claim 9, wherein the greatest depth of the concavity of the concave portion, measured along a radius of the rotor, is between 0.05 and 3 mm.

11. The machine as claimed in claim 9, wherein the concave portion is a portion of a circle or ellipse in section.

12. The machine according to claim 11, wherein the radius of the circle or the major axis of the ellipse is between 0.1 h*, where h is the thickness of the magnet, and 100 h mm.

13. The machine as claimed in claim 1, wherein the stator has concentrated winding, having coils disposed on the teeth.

14. The machine as claimed in claim 13, wherein the teeth of the stator have pole shoes.

15. The machine as claimed in claim 14, wherein the opening of the slots in the stator, measured circumferentially, is between 0.175 and 8 mm.

16. The machine as claimed in claim 15, wherein the opening of the slots in the stator is measured circumferentially between the pole shoes.

* * * * *